Oct. 18, 1938.       G. W. PIERCE        2,133,648
ELECTRICAL SYSTEM
Filed July 10, 1931        2 Sheets-Sheet 1

INVENTOR
George W. Pierce
BY
David Rines
ATTORNEY

Oct. 18, 1938.  G. W. PIERCE  2,133,648
ELECTRICAL SYSTEM
Filed July 10, 1931  2 Sheets-Sheet 2

INVENTOR
*George W. Pierce*
BY *David Rines*
ATTORNEY

Patented Oct. 18, 1938

2,133,648

UNITED STATES PATENT OFFICE 2,133,648

ELECTRICAL SYSTEM

George Washington Pierce, Cambridge, Mass.

Application July 10, 1931, Serial No. 549,830

35 Claims. (Cl. 250—20)

The present invention relates to electrical systems, and more particularly to oscillatory systems controlled by electromechanical vibrators, like piezo-electric crystals. The invention relates also to piezo-electric oscillators and resonators constituted of or comprising such vibrators. This application is a continuation in part of application, Serial No. 695,094, filed February 25, 1924.

Such vibrators, as is now well known, execute mechanical vibrations under vibratory electrical stimulus and, conversely, develop electrical potentials as a result of their mechanical vibrations. They have, in general, a plurality of particular modes or periods of mechanical vibration, of different frequency.

For convenience, the action of the electric forces to cause mechanical displacements of the crystal, resulting in its vibration, will be termed "stimulation"; and the development by the vibrating crystal of the electromotive forces that react upon the circuit will be termed "response".

These mechanical and electrical effects are normally transitory, for the crystal body will not, of itself, persist in continuous vibration. An object of the present invention, however, is to provide a novel system for rendering these effects oscillatory in character, and persistent.

With this end in view, the crystal may be so connected into circuit as to render these effects oscillatory in character and persistent, the said circuit then producing oscillations at very nearly constant frequency. A novel electrical system is thus produced comprising an electric circuit that is not, in itself, capable of sustaining oscillations, and that is not, in itself, a source of alternating currents, in combination with an electromechanical vibrator that will not, in itself, persist in continuous vibration; the electrical parameters of the system being such as to render the system stably non-oscillatory when not under the control of the electromechanical vibrator; the connections being such, however, that the resulting electrical system will sustain oscillations of a frequency determined, to a high degree of precision, by the frequency of one of the modes of mechanical vibration of the electromechanical body.

A further object is to provide an improved system for producing oscillations at very nearly constant frequency.

Another object is to improve the efficiency of oscillatory systems.

It is still another object to improve and simplify the apparatus employed in, and the electrical connections of, oscillatory systems.

A further object is to provide a novel electromechanical vibrator, and more particularly for use as a piezo-electric oscillator or resonator.

Other and further objects of the invention will be explained hereinafter, and will be pointed out in the appended claims, it being understood that it is intended to cover in the appended claims all the novelty that the invention may possess.

In the accompanying drawings.

The drawings show the employment of the electro-mechanical vibrator as the means for determining the wave frequency. This electro-mechanical vibrator is differently disposed in the different diagrams, so as to illustrate the many different ways in which the vibrator may be employed to introduce oscillations into the system, but it is to be understood that the electromechanical-vibrator disposition, in a particular diagram, is not specific to that diagram, but that the vibrator may be similarly disposed in the other diagrams.

The electro-mechanical vibrator is illustrated as of the piezo-electric type, the oppositely disposed sides or surfaces 4 and 6 of the crystal 2, 102 or 202 being provided with opposed, conducting terminals, plates or electrodes 8 and 12, by means of which the crystal is adapted to be connected into an electric circuit.

The invention is not, however, in its broader aspects, limited to such a crystal body, but may employ any body or mechanism having like properties in itself, or like properties introduced by electric currents, electric polarization, magnetic fields, etc. It may be constituted of any suitable substance having sufficiently pronounced piezo-electric properties. Quartz is preferred, because of its durability and constancy. The term "electro-mechanical vibrator"—or, more simply, the term "vibrator"—will be employed hereinafter in the specification and the claims to denote any substance, material, or arrangement, whether or not crystalline in character, that is endowed with the above-referred-to property of changing shape or dimensions under the action of an electric force or an electric current and of reacting on the electric circuits. The apparatus of the present invention may, however, be employed equally well at high and at low frequencies.

Figure 1:
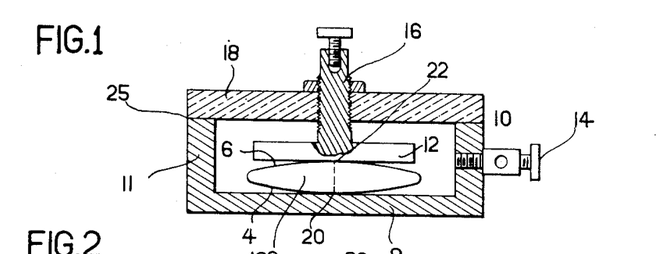
Fig. 1 is a sectional view of an electro-mechanical vibrator comprising a piezo-electric body provided with electrodes.

This vibrator may be of any desired form as, for example, the lenticular shape illustrated in Fig. 1, but it may be of any other shape, as a parallelopiped or a flat disc, as shown in the other figures.

Circular discs may be cut more quickly than parallelopipeds, because only the two faces 4 and 6 need to be made parallel.

Piezo-electric crystal bodies possess at least one, and usually two or more, axes—known as the electrical axes E of the body—that have definite orientations in the original crystal. Quartz crystals have three such electric axes E.

The circular-disc quartz-plate form, with its peripheral cylindrical edge rounded, is illustrated at 202, in Fig. 9, as having three axes, as follows: the optic axis, indicated by the arrow O, parallel to the lengthwise natural edges of the original quartz crystalline body from which the circular disc member 202 is cut or otherwise formed; one of the three electric axes E, parallel to two opposite, natural faces of the original crystal; and the third axis B, perpendicular to the optic and electric axes O and E. The diameter of the disc 202 is shown coincident with a plane parallel to the optical axis O, and its flat plane base surfaces 4 and 6 are disposed in the planes parallel to this optic axis along which the cylindrical disc member 202 was cut from the crystalline body.

The flat rectangular or parallelopiped quartz-slab form is illustrated at 2, in Figs. 2 to 8, inserted between the parallel conducting electrodes 8 and 12.

One of the electric axes E of the crystal 2, 102 or 202 is assumed, for concreteness, to be in the direction of the thickness of the crystal plate, along the line 20—22, perpendicular to the electrodes 8 and 12.

For high frequencies, it is necessary to use the period of the crystal vibrations determined by a dimension of the specimen which is small compared with i's other dimensions, as by its thickness, the crystal plate vibrating in the thickness mode. The thickness dimension, as before stated, is assumed, for concreteness, to be the dimension along the electric axis E of the crystal, and this must be of the order of one millimeter for a frequency of 3000 kilocycles per second.

This value of 3000 is not exact. It varies from specimen to specimen, and the value appropriate to a particular specimen may be determined by experiment. Representing by $d$ the diameter, by $t$ the thickness of the member, in millimeters, and by $f_1$, $f_2$ and $f_3$ the three fundamental frequencies of oscillation of the crystal disc, expressed in kilocycles per second, the following formulas will be found to be approximately satisfied:

$$f_1 = \frac{2715}{d}$$

$$f_2 = \frac{3830}{d}$$

$$f_3 = \frac{2870}{t}$$

Two of the said three fundamental frequencies are thus functions of the diameter of the disc, and one is a function of its thickness.

The electrode 8 is shown constituted of a flat bottom or base plate of a metal box, container or housing 10, within which the vibrator 2, 102 or 202 is centrally located, as shown. The vertical side walls 11 of the housing 10 are integral with the base plate 8. In the construction illustrated in Fig. 1, the sides 4 and 6 of the crystal are convex. The side or surface 4 is shown engaging the bottom or base plate 8 intimately. It may contact with, or be slightly separated from, this base plate. The opposite side or surface 6 contacts with, or is near to, the electrode 12 disposed in the housing 10 between the crystal and an insulating cover 18. The cover 18 may be constituted of hard rubber. The side walls 11 of the crystal receptacle are shown in Fig. 1 as spaced from at least two sides of the crystal. The crystal is thus secured in the casing or housing 10 between the electrodes 8 and 12 without being in any way restricted, so that it is free to vibrate mechanically between the opposed electrodes 8 and 12, according to any of its modes or periods of natural vibration or any of its overtones of such modes of vibration. Freedom from restriction is further facilitated by the fact that as the surfaces 6 and 4 are convex, the plates 8 and 12 approximate or touch the crystal at the two oppositely disposed points or small areas 20 and 22, thus allowing for expansion or contraction with small friction or obstruction.

In Fig. 1, the electrode 8 is electrically connected to a binding post 14, and the plate 12 is electrically connected to a binding post 16 suspended over the crystal. Electrical connection is thus established between the two sides 4 and 6 of the crystal and the terminal binding posts exterior of the housing. The plate 12 may be caused to approach the vibrator 2, 102 or 202 more or less nearly, as desired, or into pressure con'act with the vibrator 2, 102, or 202 by screwing with the thumb and finger the binding post 16 in one direction or the other. The said pressure contact is applied over or at relatively small medial areas compared to the dimensions of the vibrator, corresponding to diametrically oppositely disposed medial nodal points of movement of the vibrating crystal, where there is small vibratory movement of the crystal substantially along a medial electric axis E when the crystal is vibrated transversely to the direction of this axis, a node of motion being produced at these relatively small nodal areas during such vibration. Damping of the vibrating crystal is thus reduced to a minimum. The binding post 14 is simply secured to a side 11 of the receptacle or box 10, near the bottom end wall 8. The binding post 16 may be in the form of a thumb screw threaded through the cover 18, and is secured to the plate 12, as shown, for manually shifting the position of the conductive electrode 12 in parallel planes toward or away from the surface 6 of the crystal 2.

Figure 2:
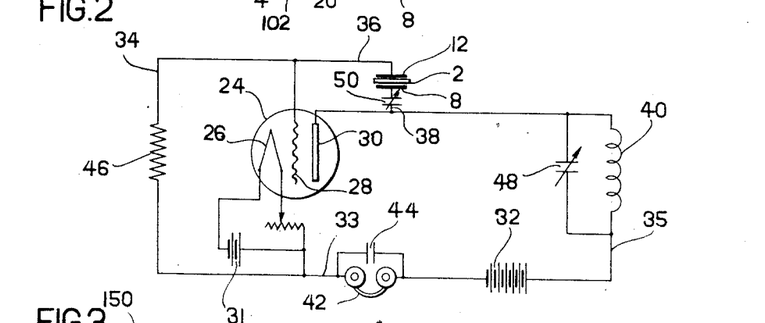
Fig. 2 is a diagram of one form of Pierce oscillator embodying the invention.
Figures 3, 4, 9:
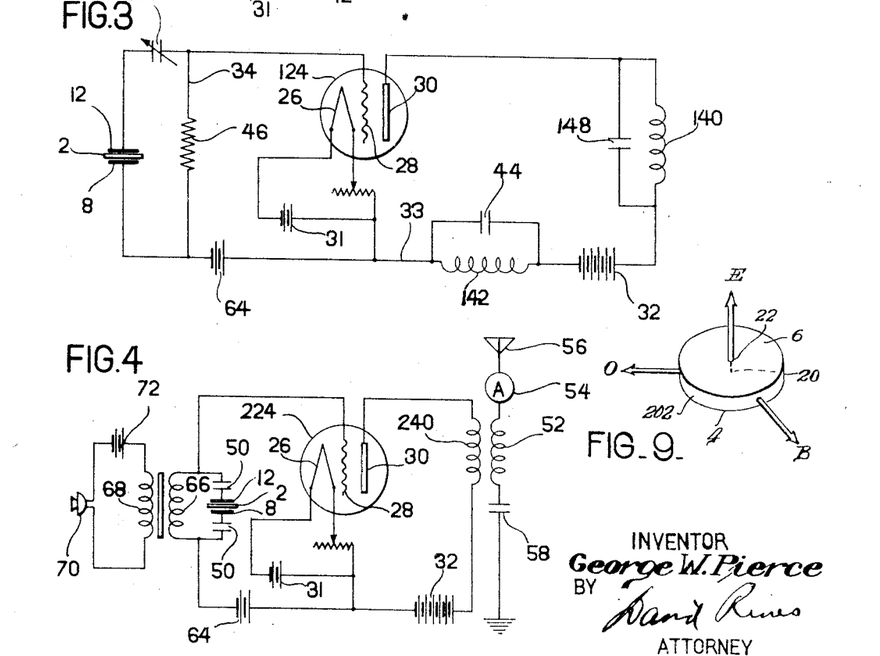
Fig. 3 is a similar diagram of another form of Pierce oscillator embodying the invention.
Fig. 4 is a view of a Pierce oscillator, radio-telephony transmitting apparatus embodying the invention.
Fig. 9 is a perspective view illustrating one form of piezo-electric oscillator or resonator embodying the present invention, the crystal electrodes being omitted, for clearness.

The same electrodes 8 and 12 are shown also in Figs. 2 to 8, inclusive, but are omitted from Fig. 9 for clearness. In Figs. 2 to 9, inclusive, the lower flat surface 4 of the crystal 2 or 202 is horizontally disposed in contact with the upper flat surface of the electrode 8, and the electrode 12 is spaced slightly above the upper flat surface 6 of the crystal 2 or 202. Depending upon the use to which the crystal is put, it may be termed a piezo-electric oscillator or a piezo-electric resonator. In order to exhibit its piezo-electric properties, electrical connection with the upper surface 6 of the crystal 2 or 202 may be established through the electrode 12, and with the lower surface of the crystal 2 or 202 through the electrode 8, into any electric circuit, such as a high-frequency generator. The resonant mode of vibration may be in the direction of the axis B, or, alternatively, in the direction of the electric axis E, and any movement other than one of these desired vibrations is prevented. The crystal 2 or 202 is thus substantially horizontally supported between and adjacent to the lower substantially horizontally disposed substantially flat surface of the upper electrode 12 and the upper substantially horizontally disposed substantially flat surface of the lower electrode 8, with its oppositely disposed substantially flat upper and lower faces 4 and 6 substantially horizontally disposed respectively adjacent and substantially parallel to the respective substantially flat surfaces of the electrodes. In the modification of Fig. 1, too, the electrode 12 may be adjusted so as to be wholly free of the upper surface 6 of the crystal 102, so as to leave an air gap between the electrode 12 and the said upper surface 6 of the crystal 102.

Being free to vibrate according to the desired mode of vibration, longitudinal or transverse, without restriction, and without interference with its vibrations, the crystal will vibrate without introducing variations in frequency, and the constancy of frequency is unaffected from error sources of this nature. I have found, however, that very minute variations of frequency of the order of one three-hundredths of one per cent may be introduced by bringing the electrodes more or less near to the piezo-electric vibrator. This is of importance in the final adjustment of such a vibrator, where extreme precision of frequency is required.

By means of this variable-capacity coupling between the crystal and the tuned circuit, the oscillator is thus capable of generating any wave within the limits of a predetermined band, and the period of the crystal may be increased or decreased by any desired amount so that the oscillator may sustain oscillations of any selected frequency within the predetermined band.

Variable pressure contact of the plate 12 against the vibrator 2, 102 or 202 will also vary the frequency.

The receptacle may be hermetically sealed to the atmosphere by enclosing with celluloid varnish, wax or other coating (not shown) so much of the parts thereof as contain cracks or other openings to the atmosphere. The cracks 25 between the side walls 11 and the cover member 13 may thus be sealed by the wax or other coating. The cracks between the binding posts and the insulating members upon which they are mounted may similarly be sealed. The vibrator becoming thus hermetically closed in the housing, it is protected from the action of moist gases, dust and the like. To attain great constancy of frequency, the housing may be evacuated so as to remove air or other gas and thus eliminate air-column resonance, which by its variation with temperature introduces small changes of frequency. The sealed vessel (not shown) may be of metal or glass that is kept in a constant-temperature bath.

For illustrative purposes, a multi-electrode vacuum or electron or electron-discharge tube 24, 124, 224, 324, 424, 524 or 624 is diagrammatically shown provided with three sensitive elements or electrodes, namely, a filament or cathode 26, a plate or anode 30, and a grid 28 for controlling the transmission of current between the cathode and the anode. The filament 26 is connected with a filament-heating battery 31. The vacuum tube is provided with an input circuit between or including the grid 28 and the cathode 26, and an anode or plate or output circuit between or including the grid 28 and the plate 30. A plate battery 32 is connected with the filament 26 by a conductor 33, and with the plate 30 by a conductor 35 and constitutes a source of energy for the anode 30. An element 40, 140, 240, 340, 440 or 540, shown as an inductance coil having a distributive capacity and resistance, is connected in the output or plate circuit, between the battery 32 and the conductor 35. The coil 40, 140, 240, 340, 440 or 540, which acts as an admittance, may be replaced by a resistor or any other proper type of electrical apparatus or elements, tuned or untuned, in which the oscillatory power is utilized. If a resistor 40, 140, 240, 340, 440 or 540 is employed, its distributive capacity and the capacity between the electrodes of the tube supply the parameters having the requisite values for determining the oscillating condition, as will be understood from the description to follow. Other elements resonant to a frequency widely different from the oscillation frequency may also be used.

An impedance element 46 (Figs. 2 and 3), 66 (Figs. 4 and 6), or 80 (Fig. 5) may be connected in the grid or input circuit. The impedance element 46 is constituted of a grid-leak resistor and the impedance element 66 takes the form of the secondary winding of a modulation transformer. In Fig. 4, the impedance element 66 is disposed in parallel with the vibrator. If desired, a biasing battery 64 may be employed to bias the grid 28 to a predetermined potential, so that the potential of the grid may fluctuate about the biased value.

A tuning condenser 48, 148 or 248 may be connected in parallel with the coil 40, 140, 240, 340, 440 or 540, or the power of the system may, for some purposes, be increased by electrical tuning of some other element into or near resonance with the frequency of mechanical vibration of the vibrator. Such tuning makes it possible to exclude undesired frequencies. To understand what is meant by the term "tuning", it will be recalled that, when a circuit exhibits inductive reactance for one band of frequencies, capacitive reactance for a second band of frequencies, and zero reactance for a particular frequency between these two bands, the circuit is said to be "tuned" or "resonant" at the said particular frequency. Alternatively, this may be stated in terms of the phase relation between the voltage across the circuit and the current through the circuit. When, at any particular frequency, a circuit that exhibits reactance at other frequencies exhibits an impedance that is a pure resistance at the said particular frequency, so that the said current and the said voltage are in phase, that circuit is said to be tuned or resonant at the said particular frequency.

A telephone receiver 42, 242, 342 or 442, with or without a bypass condenser 44, may be inserted in the conductor 33. The telephone 42, 242, 342 or 442 may be replaced by an inductance 142, the primary winding of a transformer, or the input terminals of an amplifier, or it may be wholly short-circuited.

As so far described, the system is not oscillatory. If, now, one of the electrodes 12 of the electro-mechanical vibrator be connected by a conductor 36 with the grid 28, and the other electrode 8 by a conductor 38 to some point in the circuit of the plate 30, the system will oscillate with sustained oscillations, and the vibrator will vibrate mechanically at a frequency determined, to a high degree of precision, by the frequency of one of the modes of mechanical vibration of the vibrator. A space-discharge oscillator is thus produced, the oscillating frequency of which is dependent merely on the physical dimensions and properties of the crystal 2, 102 or 202, is substantially independent of the electrical parameters of the circuits, and is essentially unmodifiable, even by large changes of these parameters, except in cases where certain controllable changes, as hereinafter stated, may result in shifting the frequency from that of one mode to that of another distinct mode; for, as is described in the aforesaid application, the mode of vibration depends somewhat on the point of connection to the plate circuit.

Assuming the parameters of the circuit to be properly chosen to produce crystal-controlled oscillations, as by approximate adjustment of the various elements of the system, the system will oscillate with a frequency determined by the frequency of some resonant mode of mechanical vibration of the electromechanical vibrator; that is, the parameters of the system will have electrical characteristics such as to render the system oscillatory under the control of the vibrator at a substantially constant frequency that is stabilized and determined by some mode of mechanical vibration of the vibrator substantially independent of the value of the element 40, 140, 240, 340, 440 or 540, and such as to render the system stably non-oscillatory when not under the control of the vibrator.

It will be noted that the electrical system is not oscillatory in the absence of the vibrator, but that, once the vibrator is connected into circuit, the system is oscillatory and with a frequency determined by the frequency of some mode of mechanical vibration of the vibrator and substantially independent of the value or nature of the element 40, 140, 240, 340, 440 or 540. The system can not oscillate except when under the control of the vibrator. The vibrator is stimulated by the oscillations to maintain it in vibration and responds to maintain the system in oscillation with a fixed period determined by the vibrator, the electrodes 8 and 12 acting conjointly for stimulation and response.

An impedance, shown as a variable capacitance 50 and 150, inductance 350 or resistor 250 and 450, may be inserted between the plate 30 and the grid 28, in series with the vibrator, on one side (Fig. 2) or the other (Fig. 3) or both (Fig. 4) of the vibrator, to relieve the voltage on the vibrator, thus to control the intensity of the vibrations of the vibrator and, therefore, the amplitude of the oscillations of the vibrator, or of the current fed back from the output circuit to the input circuit. The adjustment of the impedance 50, 150, 250, 350 and 450, like the adjustment of the air gap between the vibrator 2 and the electrode 12, will control the frequency. The impedance, such as the condenser 50, may be connected in parallel with the vibrator instead of in series therewith.

In order to adapt the invention for transmission, the coil 40, 140, 240, 340, 440 or 540 may be coupled to a coil 52 in the usual manner, as illustrated in Fig. 4. The coil 52 is connected, in series with a hot-wire ammeter 54, to an antenna 56, and through a tuning condenser 58, to the ground. These connections serve admirably for radio-telephone transmission. If the transmission is to be applied to a telephone line, the antenna and ground connection may be replaced by the well known connections to line wires. The coil 40, 140, 240, 340, 440 or 540 and the coil 52 are so adjusted as to tune the system for the maximum current, as observable in the ammeter 54. The primary winding 68 of the modulation transformer may be connected to a microphone 70, in circuit with a source of energy, shown as a battery 72. The variations produced by the microphone will modulate the carrier oscillations of the system. The operation will be understood by persons skilled in the art without further description.

Though the invention is illustrated in connection with a radio telephone, corresponding connections for transmitting by telegraph will be obvious to those skilled in the art.

Both in telegraphy and in telephony, the oscillations of the system will be kept at practically constant frequency by the vibrator, making it possible, for example, to use a very high frequency, with all the advantages flowing therefrom.

In all the illustrations so far described, the electromechanical vibrator has been inserted between the grid and the plate of the vacuum tube. This arrangement is by no means essential. The vibrator is inserted in the system of Figs. 3 and 4 in the input or grid circuit, between the filament and the grid; and in that of Fig. 5, in the plate circuit, between the filament and the plate. The winding 40, 140, 240, 340, 440 or 540 acts as an admittance. In general, if any electric system is provided with two oscillation circuits, each, for example, having a condenser in parallel with an inductance, one of the two circuits may be replaced, according to the present invention, by the electromechanical vibrator, and the oscillations of the resulting system, when established, will be of the frequency of the vibrator and highly constant.

Electric circuits have heretofore been produced with parameters having electrical characteristics such as to render the system stably non-oscillatory in the absence of a tuned element of the system and such as to render the system oscillatory when the tuned element is connected with the system. One of the prior-art circuits, for example, comprised a tuned element in the grid circuit and another tuned element in the plate circuit, the grid and plate circuits being uncoupled except for the capacity coupling between the grid and the plate. Such circuits, as is well known, will not oscillate unless proper circuit elements are chosen. In the oscillator herein shown, one of the said tuned elements of the prior art may be replaced by the electromechanical vibrator in the grid circuit for example, as illustrated in the drawings. As in the case of the prior-art circuits, oscillations will or will not be produced, depending upon whether proper circuit elements have been chosen; but when oscillations are established, they will be of the frequency of the vibrator and highly constant.

In Fig. 4, the vibrator is connected in parallel to the winding 66 of the modulation transformer. The winding 66 may be replaced by a resistor of high resistance with a new disposition of the microphone. Corresponding connections for transmitting by telegraph, or for receiving, will be obvious to those skilled in the art.

Figures 5, 6, 7, 8, 10:
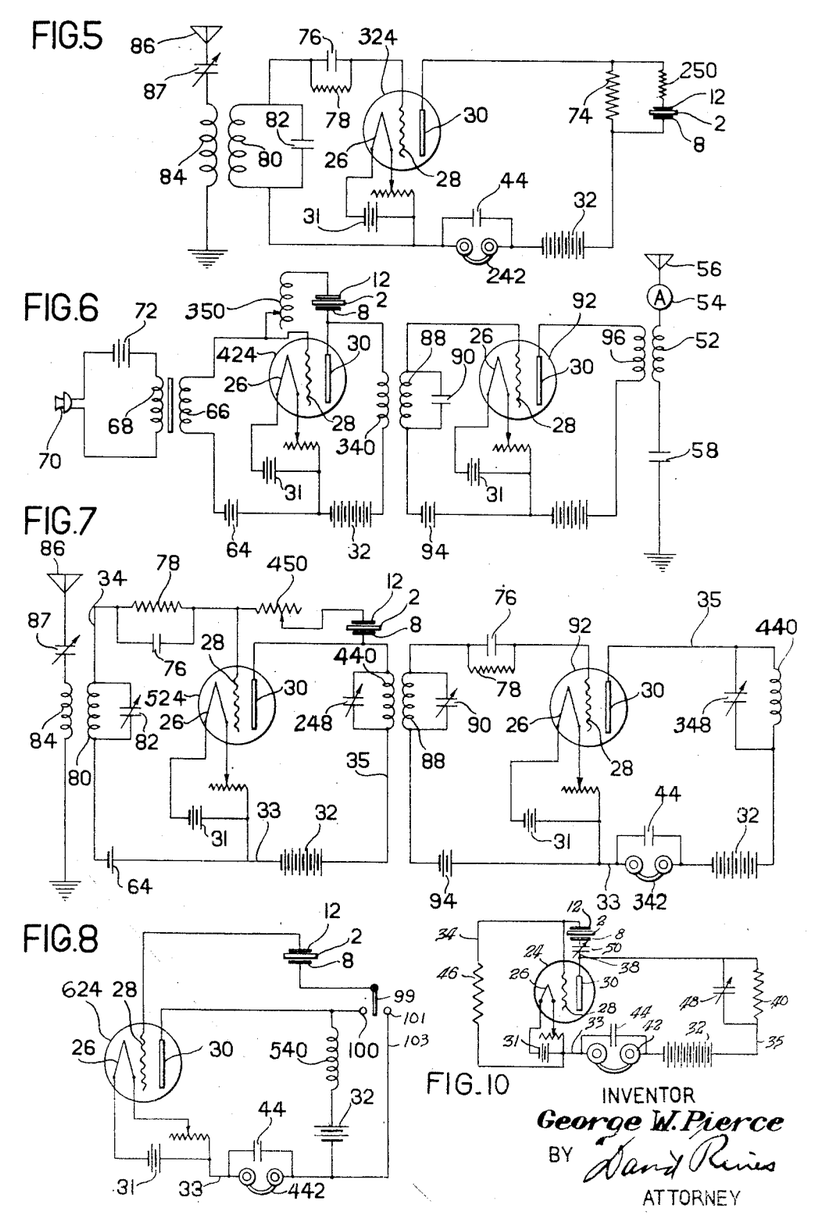
Fig. 5 is a view representing an oscillating receiving system for beat reception embodying the invention.
Fig. 6 is a view of an oscillatory radio-telephonic transmitter using power amplification and embodying the invention.
Fig. 7 is a corresponding view of a receiver.
Fig. 8 is a diagrammatic view embodying the invention and illustrating a means for changing from one form of Pierce oscillator to another.
Fig. 10 is a diagram similar to Fig. 2 with modified elements.

A receiving system is illustrated in Fig. 5. The vibrator is shown connected in the output circuit, between the plate and the filament, and is shunted by a bypass 74 for direct current. The bypass 74 may be a radio choke, an inductance winding, a resistor, or a combination of these. The bypass 74 is preferably so chosen that the circuits shall have parameters such as to make the system stably non-oscillatory when the crystal is removed or restrained from vibration. A blocking condenser 76, shunted by a leak resistor 78, and a winding 80, shunted by a tuning condenser 82, to render the grid circuit tunable, are connected in the grid circuit, between the filament and the grid. If the parameters of the circuits are properly chosen, as by approximate adjustment of the condenser 82, the system will oscillate with a frequency determined by that mode of vibration of the vibrator that is determined by a dimension of the crystal in the direction of its electric axis, though it will not oscillate in the absence of the crystal. The system will oscillate even though the parameters be varied to within very wide limits, and the frequency will be maintained constant irrespective of variations in plate or filament voltage, load or other factors. This is not true of self-oscillating circuits in which the crystal acts merely as a stabilizer. In the latter case, variation in the parameters of the circuit will result in the crystal ceasing to vibrate, though the circuits continue to oscillate. The system can be used as an oscillatory circuit.

As the system of Fig. 5 is illustrated as employed in a receiving circuit, the winding 80 is shown coupled to a winding 84, in series with a receiving antenna 86 and a condenser 87, and grounded or connected with a counterpoise. The antenna 86 will receive the radio signals transmitted from the antenna 56, which will be detected by the telephone receiver 42.

The locally generated oscillations of the circuits of the tube 24, 124, 224, 324, 424, 524 or 624 will beat with the oscillations received by the antenna 86, according to well known principles, rendering the received signals audible in the telephone 42, 242, 342 or 442, or giving them any required superaudible frequency for superheterodyne reception. These locally generated oscillations may also be employed to supply a suppressed carrier frequency if desired.

A system of this character is adapted to receive high-frequency radiations, to which the electrical tuning elements are adjusted, and to superimpose upon them the frequency of mechanical vibration of the vibrator. The two frequencies are thus coexistent at the same time, permitting beats to be produced.

A tunable transmitting system, such, for example, as is illustrated in Fig. 4, supplied with a suitable vibrator, may transmit constant oscillations of very high frequency. This has been done by me over considerable distances. Variations in frequency arise from many sources, for all the circuit constants or parameters are continuously varying. For example, the mere running down of the battery, thus changing its voltage, the variation of inductance, the aging of a condenser, deterioration of the vacuum tubes, or a mere change in temperature,—these and many other factors each introduces changes in the circuit constants and produces a different frequency from the frequency intended. No such difficulties are encountered in accordance with the present invention. The frequency is maintained constant irrespective of the parameter variations. The constancy of the beat note and the consequent certainty of being always in adjustment to receive the given signals was found to be of great value, rendering possible the use of very high frequencies.

An oscillator of the type described is mechanically limited as to exceedingly high frequencies through inability to produce a crystal of the requisite thinness, which at the same time will be mechanically strong enough to permit handling and use. According to the present invention, however, the requisite high frequency may be obtained by combining a frequency multiplier with a master oscillator having a crystal of not excessive thinness; specifically, as illustrated, by coupling the frequency multiplier to the output of the oscillator so as to receive oscillatory energy therefrom. Incidentally, the frequency multiplier serves also as a power amplifier to amplify the signal strength, the frequency multiplier being operated at a harmonic relationship to the fundamental (or a harmonic) frequency of the master oscillator, thus making it possible to transmit at an enhanced harmonic frequency of the crystal-controlled oscillations of the master oscillator. One such system, adapted for transmission, is illustrated in Fig. 6, and another such system, adapted for reception, is illustrated in Fig. 7. Referring, first, to Fig. 6, the connections are very much as in the transmitting system of Fig. 4, except that the winding 340, instead of being directly coupled to the winding 52 of the antenna circuit, is shown coupled to or interlocked with a winding 88 that is shunted by a tuning condenser 90. The elements 88 and 90 may be tuned so as to select or pick off the fundamental or one of the many harmonics from the oscillation of the preceding circuit,—here, the plate circuit of the master oscillating tube 424. The winding 88 is connected in the grid circuit of an amplifier or frequency multiplier 92. The amplifier 92 is shown as a vacuum tube, biased by a battery 94, so as to impress a negative potential upon the grid 28 of the tube 92. A winding 96 is connected in the plate circuit of the vacuum tube 92, and is coupled to the radiating antenna 56 through the antenna coil 52. The vibrator 2, 102 or 202 determines the frequency of oscillation of the master oscillating circuit comprising the vacuum tube 424. The master oscillator, which may be of, say, 5 watts, controls, through power amplification of the fundamental or one of the many harmonics, an output in the tube 92 of much higher power, say, 50 watts, and so forth. The antenna circuit constitutes an output or load circuit coupled to the output circuit of the frequency multiplier for receiving the increased or enhanced or amplified harmonic-frequency energy of the oscillations of the master oscillator.

The plate or output circuit of the tube 92, containing the coil 96, is tuned or made resonant by the condenser 58 to a harmonic of the frequency of the master oscillator, by virtue of its coupling to the circuit of the coil 52, which is connected to the antenna-to-ground capacity. This will be understood when it is reflected that the phase-relation of the voltage across the coil 96 to the current that flows through it, at any given frequency, is in part determined by the adjustment of the condenser 58. At any given impressed frequency, therefore, there is a setting of the condenser 58 that brings the current in the coil 96 and the voltage across the coil 96 in phase. At this setting of the condenser 58, the anode circuit of the tube 92 is tuned to the impressed frequency. This frequency is practically the same as that to which the antenna circuit itself is resonant. For frequencies other than that to which the anode circuit is resonant, this anode circuit exhibits reactance and this reactance is either negative or positive, depending upon whether the frequency is higher or lower than the said resonant frequency.

By tuning the coil 52 through the medium of adjusting the condenser 58, therefore, the antenna circuit may be tuned so as to pick off a harmonic frequency of the oscillations in the circuit of the vacuum tube 24. The amplifier circuit may be itself self-oscillating and may be caused to beat with the frequency of the master oscillator 424 or a harmonic thereof; and the beat may be reduced to zero by suitably tuning the circuits of the tube 92; so that a large number of frequencies may thus be obtained and controlled. Such a system has been successfully operated by me, in practice, over a considerable distance. The coil 52 is tuned by the condenser 58 to make the plate circuit of the tube 92 resonant to the harmonic frequency selected by the tuned circuit 88, 90, thereby producing a maximum current, as observed in the ammeter 54. Energy of the harmonic frequency in the output circuit may thus be radiated through the antenna 56, or it may be amplified to other circuits in which it may be radiated or otherwise utilized.

I have utilized harmonics of the device at frequencies of 20,000 kilocycles per second, corresponding to an electric wave of fifteen meters' wave length. This range may undoubtedly be extended. The frequency of the space-discharge, harmonic producer or multiplier 92 is constant, determined by the adjustment of the electrode 12 or of the condenser or other impedance 50, 150, 250, 350 or 450. This frequency may, as stated, be some multiple of the frequency of the tube 424. The crystal prevents variation in the frequencies of the currents of the tuned circuits of the master oscillator and, therefore, of the frequency multiplier also. Any desired number of such amplifying units may be interposed in cascade, without in any way departing from the present invention.

The means for modulating the oscillations, in order that the harmonic-frequency energy appearing in the antenna or load circuit may bear signal modulations, may take any desired form. According to the illustrated embodiment of the invention, however, the primary winding 68 of the modulation transformer is shown connected to the microphone 70, in circuit with the battery 72.

The variations produced by the microphone modulate the carrier oscillations of the system; the modulated oscillations are impressed on the circuit 88, 90, which, as before stated, is tuned to a harmonic frequency of vibration of the crystal 2; the harmonically related oscillations are increased in amplitude by reason of the fact that the tube 92 acts both as an amplifier and a harmonic producer; and the modulated amplified oscillations of harmonic frequency are then transmitted to the antenna by the coils 96 and 52. The microphone 70 thus causes signal modulation of the energy of harmonic frequency to appear in the load circuit.

If the transmission is applied to a telephone line, the antenna-and-ground connections may be replaced by the well known connections to line wires.

In the power-amplifying system of Fig. 7 the radio-receiving, antenna circuit is coupled to the input circuit of the tube 524, as before described in connection with Fig. 5. The antenna 86 will receive a plurality of bands of radio-frequency currents, and the condenser 87 may be so adjusted as to cause to be impressed upon, or received in, the input circuit of the tube 524, any one of these bands, corresponding to the speech signals received from the distant station. The three-electrode vacuum tube 524, as before, may act both as an oscillator and a detector.

The opposite sides of the crystal vibrator 2, 102 or 202 may be connected in any of the ways heretofore described, it being illustrated, as in Fig. 2, connected between the grid 26 and the plate 30, so as to couple the grid and the plate circuits of the tube 24, and in series with the impedance 450. Vibrating substantially at one of its natural frequencies, it produces or generates locally, in the said input circuit, a practically constant current which is unchanged in its frequency characteristic even when other bands are selectively received. This practically constant frequency beats with the received band of radio-frequency currents, the products of the reaction of the two beating components being obtained in the output circuit of the tube 24. The beating frequency is thus independent of the frequency to which the circuits are tuned. The received band stepped down in the frequency spectrum as a result of the beating process is then transmitted to the circuits of the tube 92. Either or both of the condensers 248 and 90 which, together with the coils 440 and 88, thus act as an adjustable filter coupled to the output circuit of the tube 92, according to the super-heterodyne or double-detection practice before referred to, may be so tuned as to select from the modulation products, and pass, only the given band of radio frequencies received by the radio circuit changed in the frequency spectrum. To all intents and purposes, all other currents are wholly excluded.

The frequency of the filter 440, 248, 88, 90 is thus varied, the frequency of the oscillator being maintained constant. The signals represented by the band of frequencies thus selected will be detected in the telephone 342.

Fig. 8 illustrates a method of changing the mode of vibration of the electromechanical vibrator. As an example, I have found that with an electromechanical vibrator having one electrode 12 connected with the grid and the other electrode 8 connected with the plate, as before described, the vibrator having in series with it an inductance coil having, say, 10 millihenries to 125 millihenries, as described in my paper entitled, "Piezoelectric Crystal Resonators and Crystal Oscillators Applied to the Precision Calibration of Wavemeters", published in the "Proceedings of the American Academy of Arts and Sciences", vol. 59, No. 4, October, 1923, the vibrator oscillates with a stable, highly constant, frequency determined by the period of the vibrator along its electrical axis, the crystal vibrating in the direction of its thickness. This normally occurs when the switch arm 99 of Fig. 8 is in contact with the switch point 100 and corresponds, say, to the connections of Fig. 2. If, now, the switch arm 99 is shifted to the switch point 101, the same vibrator, being now connected by a conductor 103 and conductor 33, through the capacity 44, with the filament 26, corresponding, say, to the connections of Fig. 3, oscillates normally with a new stable frequency determined by a dimension at right angles to the said electrical axis. Since this dimension at right angles to the electrical axis is, in general, different from the dimension along the said axis, the shift of the switch arm 99 changes the oscillations from one stable frequency to another stable frequency. It is thus possible, in general, to obtain different frequencies, depending upon whether the crystal is connected between the filament and the grid or between the grid and a point in the plate circuit. Other frequencies are also obtainable, especially those determined by the harmonics, which, if desired, may be selected and individually amplified by amplifier connections to additional vacuum tubes.

The prime reason for the different frequency vibrations will be made apparent when it is remembered that the frequency of the oscillations of an oscillating circuit depends upon the electrical parameters of the circuit. The crystal has capacitance, inductance and resistance of variable character, and these vary so as to have different effective values in accordance with the connections of the crystal between the electrodes of the vacuum tube. When the crystal is disposed between the grid and the filament, as in Fig. 3, it cooperates with the impedance of the rest of the system in such fashion that the resultant electrical parameters are of such values as to produce oscillations determined by one mode of vibration of the crystal. When the crystal is connected between the grid and the plate, as in Fig. 2, on the other hand, the resultant electrical parameters will be of such value that the oscillations will be determined by another mode of crystal vibration.

It is possible to obtain different frequencies first: by using the same coil 40, 140, 240, 340, 440 or 540, or other apparatus, and a different crystal; secondly, by using different coils 40, 140, 240, 340, 440 or 540, or other apparatus, and the same crystal; thirdly, by varying both the crystal and the other electrical apparatus; and finally, by connecting the crystal into the system in different ways, as before described. All these cases involve a variation of impedance.

It may be remembered that, in Fig. 7, for example, when the resultant effective impedances of the grid and the plate circuits are inductive, the resultant impedance of the crystal vibrator is capacitative; and where the resultant impedances of the grid and the plate circuits are capacitative, the resultant impedance of the crystal is inductive.

In the above-described circuits, the disturbing effects,—such as those produced by changes of temperature, changes of mounting supports, changes of electrical constants, and the like,—on the frequency of oscillations usually amount to less than one one-hundredth of one per cent of the frequency. These small effects are nevertheless well under control, in the present invention, and are themselves utilized to introduce useful minute variations of frequency, when desired.

An easy way of selecting suitable circuit parameters for oscillation controlled by any vibrational mode of the crystal is to tune the circuit elements. For example, the plate or output circuit of the tube 24 may be adjusted by means of the condenser 48, 148 or 248, so as to obtain high-current output. Due to the action of the crystal in maintaining constant the oscillation frequency, such adjustments are not critical; oscillations will be generated for a wide range of values of the condenser 48, 148 or 248 or of the coil 40, 140, 240, 340, 440 or 540. Alternatively, the coil 40, 140, 240, 340, 440 or 540 may be so chosen as to have suitable resonant properties without the use of a discrete condenser 48. In attempting to obtain oscillations, of course, one would always select proper parameters; and tuning the circuits by means of the condenser 48 is one way of obtaining such proper parameters.

It will be understood that the invention is not restricted to the exact embodiments thereof that are illustrated and described herein, as modifications may be made by persons skilled in the art, and all such are considered to fall within the spirit and scope of the invention, as defined in the appended claims.

What is claimed is:

1. An electrical system having, in combination, an electric circuit, an electro-mechanical vibrator connected with the circuit for maintaining the frequency of the circuit substantially constant, and means for varying the impedance of the circuit to vary the constant frequency.

2. An oscillatory system having, in combination, vacuum-tube apparatus, a source of energy, an electromechanical vibrator, means connecting the vacuum-tube apparatus, the source and the vibrator together to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, and an impedance in series with the vibrator.

3. An oscillatory system having, in combination, vacuum-tube apparatus having a plurality of electrodes, a circuit including two of the electrodes, an electromechanical vibrator, means connecting the vibrator with one of the said two electrodes and with another electrode to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, and an impedance in series with the vibrator.

4. An oscillatory system having, in combination, vacuum-tube apparatus having a plurality of electrodes one of which is a grid, means for biasing the grid, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator, and an impedance in series with the vibrator.

5. An oscillatory system having, in combination, vacuum-tube apparatus having a plurality of electrodes, a piezo-electric crystal having two electrodes only serving conjointly both for stimulation and response, means connecting one of the crystal electrodes with one of the first-named electrodes, and connecting the other vibrator electrode to another of the first-named electrodes to constitute an oscillatory system, the parameters of the system having electrical characteristics such as to render the system oscillatory under the control of the crystal at a substantially constant frequency determined by a mode of vibration of the crystal, and such as to render the system stably non-oscillatory when not under the control of the crystal, and an impedance in series with the crystal.

6. An electro-mechanical system having, in combination, a vacuum tube, a grid circuit and a plate circuit through said tube, an electro-mechanical vibrator having two electrodes serving conjointly both for stimulation and response, an impedance, one of said electrodes being connected to a point on the plate circuit and the other of said electrodes being connected through the impedance to the grid, a source of energy, and means connecting the grid and the plate circuits, the vibrator and the source together to constitute an oscillatory system, the parameters of the system having electrical characteristics such as to render the system oscillatory under the control of the vibrator at a substantially constant frequency determined by a mode of vibration of the vibrator, and such as to render the system stably non-oscillatory when not under the control of the vibrator.

7. In combination, vacuum-tube apparatus having a plurality of electrodes comprising a filament, a grid and a plate, a piezo-electric crystal having a pair of electrodes, means connecting one of the vibrator electrodes to one of the first-named electrodes, means connecting the other vibrator electrode to another of the first-named electrodes, a tuned circuit, connections between the tuned circuit and said vibrator electrodes, and means for preventing the application of the plate potential to the vibrator comprising a variable condenser in one of the connections from the tuned circuit to one of the vibrator electrodes.

8. In combination, vacuum-tube apparatus having a plurality of electrodes comprising a filament, a grid and a plate, a tuned circuit between two of the electrodes, a piezo-electric crystal having a pair of electrodes, means connecting one of the vibrator electrodes to one of the first-named electrodes, means connecting the other vibrator electrode to the other of the first-named electrodes, and means for preventing the application of the plate potential to the vibrator comprising a condenser in series with the crystal.

9. An oscillator comprising a vacuum tube of the three-electrode type, a piezo-electric device in mechanical vibration, and an electrical impedance, said impedance being connected in a circuit in series relationship with the piezo-electric device and the grid and plate of said vacuum tube to control the amplitude of the oscillations of said piezo-electric device.

10. In combination, a vacuum tube of the three-electrode type, a piezo-electric device opposite sides of which are connected to the grid and plate, respectively, of said vacuum tube, said piezo-electric device being in mechanical vibration, and an impedance of suitable magnitude to control the amplitude of mechanical vibration of said piezo-electric device.

11. A piezo-electric oscillator which comprises a flat circular disk of crystalline material possessing piezo-electric properties in which the diameter of the disk is coincident with a plane parallel to the optical axis of the crystalline body from which said disk is formed.

12. A piezo-electric resonator which comprises a flat circular disk of crystalline material possessing piezo electric properties which has the flat surfaces thereof in planes parallel to the optical axis of the crystalline body from which the disk is formed.

13. An oscillator exhibiting piezo electric properties which consists of a flat circular disk member cut from a crystalline body in planes parallel to the optical axis of the crystalline body to a thickness where the member possesses at least one fundamental frequency of oscillation which satisfies the following formula:

$$f_3 = \frac{2870}{t}$$

where $f_3$ is the frequency expressed in kilocycles per second and $t$ represents the thickness of the member in millimeters.

14. An oscillator exhibiting piezo electric properties which consist of a flat circular disk cut to such diameter and thickness that the disk possesses at least three fundamental frequencies which satisfy the following formulae $$f_1 = \frac{2715}{d}$$

$$f_2 = \frac{3830}{d}$$

$$f_3 = \frac{2870}{t}$$

where $f_1$, $f_2$, and $f_3$ represent frequencies of oscillation expressed in kilocycles per second, $d$ represents the diameter of the disk in millimeters, and $t$ represents the thickness of the disk in millimeters.

15. A resonator exhibiting piezo-electric properties which consists of a circular disk cut from a crystalline body along the optical axis thereof, and a plane parallel to the optical axis thereof which oscillates according to the formula:

$$f_3 = \frac{2870}{t}$$

where $f_3$ is the frequency expressed in kilocycles per second, and $t$ is the thickness of the disk expressed in millimeters.

16. A quartz piezo-electric oscillator of disk shape having its plane parallel to the optic axis.

17. A piezo-electric resonator comprising a flat disk of quartz the peripheral edge of which is rounded and the plane surfaces of which are parallel to the optical axis of said quartz.

18. A piezo-electric oscillator of disk shaped crystal having its plane parallel to the optic axis and possessing a fundamental frequency which is a function of its thickness.

19. A piezo-electric oscillator of cylindrically cut quartz having its bases parallel to the optic axis and possessing at least two fundamental frequencies which are functions of its diameter.

20. The method of producing oscillations of predetermined frequency with a piezo-electric crystal capable of being set into vibration in a plurality of modes, which consists in selecting the desired mode of vibration and changing the effective reactive value of the crystal to a capacitance of definite magnitude to correspond to the predetermined frequency.

21. The method of producing oscillations of predetermined frequency with a piezo-electric crystal exhibiting positive and negative reactances over each of a plurality of different bands of frequencies characteristic of the different modes of vibration of the crystal, which consists in sustaining the piezo-electric crystal in vibration in one of said modes to the exclusion of all other modes and changing the effective reactive value of the piezo-electric crystal from a positive value to a negative value to correspond to that of the predetermined frequency.

22. The method of operating a crystal-controlled, vacuum-tube oscillator having a parallel tunable circuit in its output circuit which consists in changing the effective reactive value of the tunable circuit to an inductance of predetermined magnitude in order to operate the crystal at a desired frequency at which it exhibits a capacitative reactance.

23. An electro-mechanical system having, in combination, an electric circuit having vacuum-tube apparatus comprising a plurality of electrodes, an electro-mechanical vibrator connected with the circuit for maintaining the frequency of the circuit substantially constant, an impedance in circuit with the vibrator, and means for varying the impedance to vary the substantially constant frequency.

24. An oscillator comprising vacuum-tube apparatus having a plurality of electrodes comprising a filament, a grid and a plate, a piezo-electric device in mechanical vibration, and means for restricting the potential across said piezo-electric device comprising an electrical impedance connected in a circuit in series relationship with the piezo-electric device and the grid and the plate.

25. In combination, vacuum-tube apparatus having a plurality of electrodes comprising a filament, a grid and a plate, a piezo-electric device opposite sides of which are connected to the grid and the plate, respectively, said piezo-electric device being in mechanical vibration, and means for restricting the potential across said piezo-electric device comprising an impedance of suitable magnitude.

26. The combination of vacuum-tube apparatus having a plurality of electrodes comprising a filament, a grid and a plate and having an input circuit and an output circuit, a piezo-electric device opposite sides of which are connected between the plate and the grid, said piezo-electric device coupling said circuits so that energy may be fed from the output circuit to the input circuit controlled and stabilized as to frequency in accordance with the natural period of the piezo-electric device, and means for restricting the potential across said piezo-electric device.

27. In an electrical system, an hermetically sealed container having therein an electron-emitting cathode, an inner cold electrode and an outer cold electrode, circuits connecting said inner and outer cold electrodes with said cathode, and a circuit comprising the series combination of a two-electrode piezo-electric crystal and a condenser coupling said inner- and outer-electrode-cathode circuits together, whereby oscillations are set up of a frequency fixed in the main by the frequency of said piezo-electric crystal.

28. The combination of an electrical oscillator, a piezo-electric crystal associated with said oscillator, the frequency of said piezo-electric crystal determining the frequency of the electrical oscillator, and means for interposing impedance in series with said piezo-electric crystal in order to change the vibrating frequency of said piezo-electric crystal.

29. The combination of an electrical oscillator, a piezo-electric crystal associated with said oscillator, the frequency of said piezo-electric crystal determining the frequency of the electrical oscillator, and a variable impedance in series with said piezo-electric crystal, said impedance being varied to effect a corresponding variation in the vibratory characteristic of said piezo-electric crystal.

30. Means for selectively controlling the frequency of an electric circuit within a limited band of frequencies including a piezo-electric device and means including a variable impedance for selectively changing to a desired value the frequency of vibration of said piezo-electric device in said circuit.

31. The method for adjusting the frequency of an oscillator, the frequency of which is controlled by a piezo-electric crystal disposed between suitable electrodes, which includes the step of selectively varying the value of impedance in the control circuit containing the crystal and its electrodes, until the desired frequency is obtained.

32. An electrical system having, in combination, an electric circuit, a piezo-electric-crystal vibrator connected with the circuit for maintaining the frequency of the circuit substantially constant, and means for varying the impedance of the circuit to vary the frequency of vibration of the crystal.

33. An electro-mechanical system having, in combination, an electric circuit having vacuum-tube apparatus comprising a plurality of electrodes, an electro-mechanical vibrator connected with the circuit for maintaining the frequency of the circuit substantially constant, an impedance in circuit with the vibrator, and means for varying the impedance to vary the constant frequency.

34. The method of adjusting the frequency of an oscillator, the frequency of which is controlled by a piezo-electric crystal disposed between suitable electrodes, which includes the step of selectively varying the value of impedance in the control circuit containing the crystal and its electrodes, until the desired frequency of vibration of the crystal is obtained.

35. An electro-mechanical system having, in combination, an electric circuit having vacuum-tube apparatus comprising a plurality of electrodes, an electro-mechanical vibrator connected with the circuit for maintaining the frequency of the circuit substantially constant, an impedance in circuit with the vibrator, and means for varying the impedance to vary the substantially constant frequency of vibration of the crystal.

GEORGE W. PIERCE.